United States Patent [19]

Knudson

[11] 4,018,296
[45] Apr. 19, 1977

[54] FOUR WHEEL TRACTOR

[76] Inventor: Jerome Leslie Knudson, Crosby, N. Dak. 58730

[22] Filed: Sept. 29, 1975

[21] Appl. No.: 617,840

Related U.S. Application Data

[63] Continuation of Ser. No. 457,380, April 19, 1974, abandoned.

[52] U.S. Cl. .............................. 180/41; 280/6 H; 280/6.11
[51] Int. Cl.² ........................................ B60G 25/00
[58] Field of Search ................. 180/81, 41, 45, 42; 280/6 R, 6 H, 6.1, 6.11, 111, 112 R, 112 A, 106, 81.5

[56] References Cited

UNITED STATES PATENTS

| 3,516,260 | 6/1970 | Wood | 180/41 X |
|---|---|---|---|
| 3,652,101 | 3/1972 | Pivonka | 280/6.1 |
| 3,729,210 | 4/1973 | Cunningham | 280/112 R X |
| 3,792,748 | 2/1974 | Regier | 180/41 X |
| 3,805,908 | 4/1974 | Thompson | 180/52 |

*Primary Examiner*—Joseph F. Peters, Jr.
*Assistant Examiner*—R. Schrecengost
*Attorney, Agent, or Firm*—Robert E. Kleve

[57] ABSTRACT

The invention comprises a self leveling tractor which automatically levels the main frame of the tractor relative to the front and rear axles and wheels of the tractor. The tractor has a pair of axle frames beneath the underside of the main frame at the front and rear portions respectively of the tractor. The axle frames are pivotally mounted to the main frame about a common axis which extends longitudinally from the front to the rear of the tractor along the underside of the main frame. A pair of hydraulic cylinders are positioned on opposite sides of the rear of the tractor, one cylinder is pivotally connected between the main frame on one side of the rear axle frame. The other cylinder is pivotally connected between the main frame and the other side of the rear axle frame. The front and rear axles have wheels at their outer ends. The front and rear axles are fixed to the front and rear axle frames, respectively, to pivot with the axle frames. A mercury leveling unit is mounted to the main frame and actuates the hydraulic cylinder to pivot the main frame to horizontal relative to the rear axle frame when the rear axle and its wheels are tilted to one side or the other because of the terrain angle.

1 Claim, 6 Drawing Figures

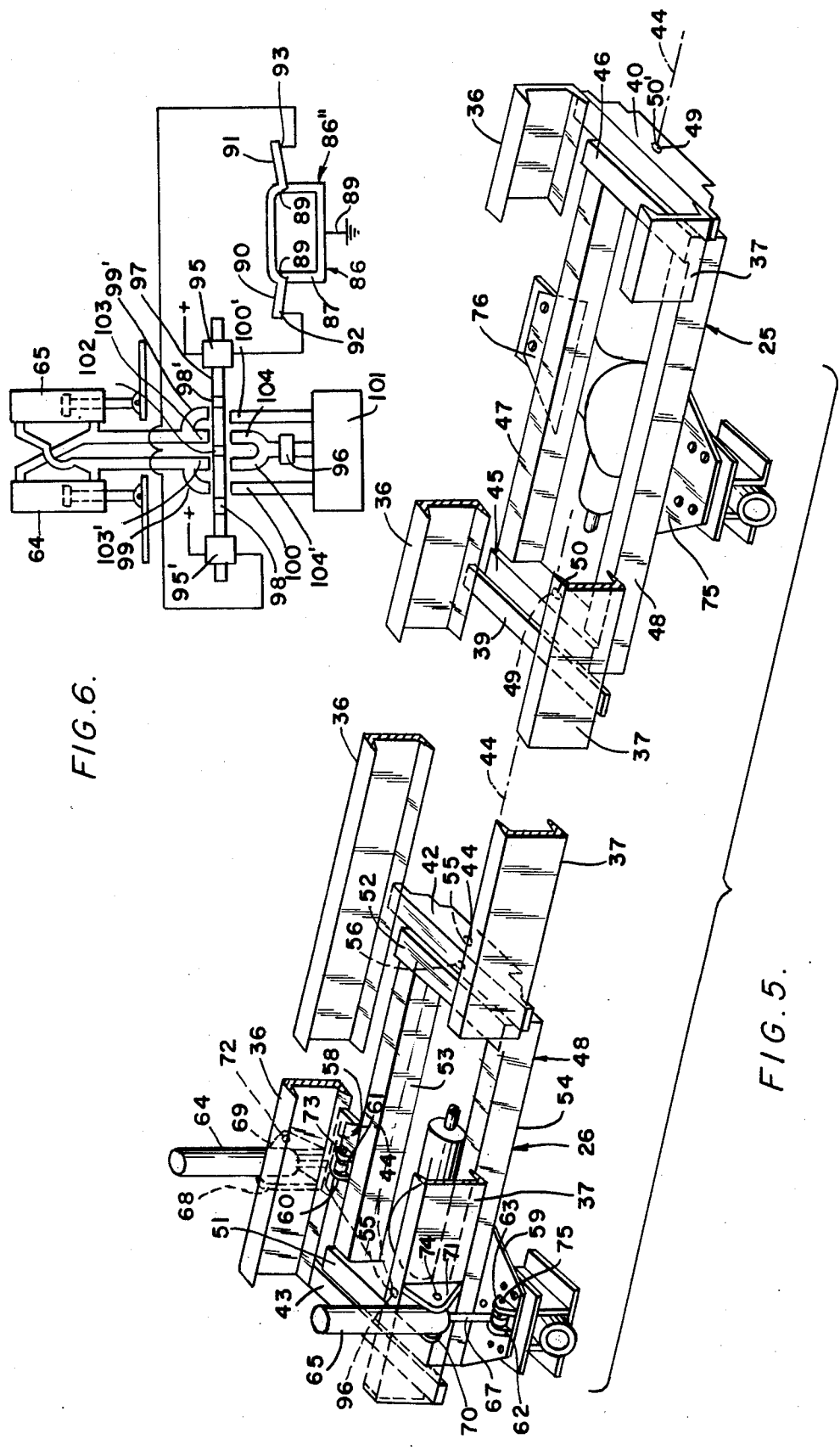

FOUR WHEEL TRACTOR

This is a continuation of application Ser. No. 457,380, filed Apr. 19, 1974 and now abandoned.

This invention relates to four wheel tractors.

The operation of a farm tractor in hilly country has been a problem in that the upper wheel has a loss of traction, because the center of gravity changes when the tractor is tilted and this increase in angularity applies more weight to the lower side tires and less to the upper side tires.

There are certain parts of the farming country which have very hilly land and have not been able to utilize the conventional type of farm tractor. The farmers have had to resort to crawler types of tractors, which are expensive noisy, dirty, and rough riding. By applicant's invention the four wheel drive tractor has a main frame which can tilt to at least partially correct or compensate for this change in the center of gravity, which results in better traction for the upper tires.

It is an object of the invention to provide a novel four wheel tractor with the wheels and axle mounted to frames separate from the main frame to pivot relative to the main frame and with cylinders to level the main frame relative to the wheels and axles to compensate for the change in the center of gravity when the tractor is angled to one side because of the angle of the terrain.

It is another object of the invention to provide a novel four wheel tractor with sub frames for the front and rear axles which are pivotally mounted to the main frame of the tractor and hydraulic means to level the tractor main frame relative to the sub frame.

It is another object of the invention to provide a novel tractor having leveling means to automatically self level the main frame of the tractor relative to the wheels.

Further objects and advantages of the invention will become apparent as the description proceeds and when taken in conjunction with the accompanying drawing wherein:

FIG. 5 is a fragmentary perspective view of the main frame and rear and front sub frame and axles and leveling cylinders of the tractor.

Briefly stated, the invention comprises a four wheel drive tractor having a main frame, a front sub frame and a rear sub frame, a rear axle with drive wheels thereon with said rear axle being fixed to said rear sub frame, a front axle with drive wheels thereon with said front axle being fixed to said front sub frame, said front and said rear frame being each pivotally mounted to the underside of said main frame to pivot about an axis extending longitudinally from the front to the rear of said main frame, said rear sub frame having a pair of hydraulic cylinders positioned on each side of the rear portion of the main frame, with their one ends pivotally mounted to the laterally outer opposing edges of the sub frame and with their other ends pivotally mounted to the opposing sides of the main frame, a mercury activated leveling means to activate the hydraulic cylinders in reverse relation to one another, so that when the rear wheels are tilted to one side because of the angular terrain, the hydraulic cylinders actuating in opposed direction to one another will pivot the main frame to a horizontal position about said longitudinal axis.

Figure 1:
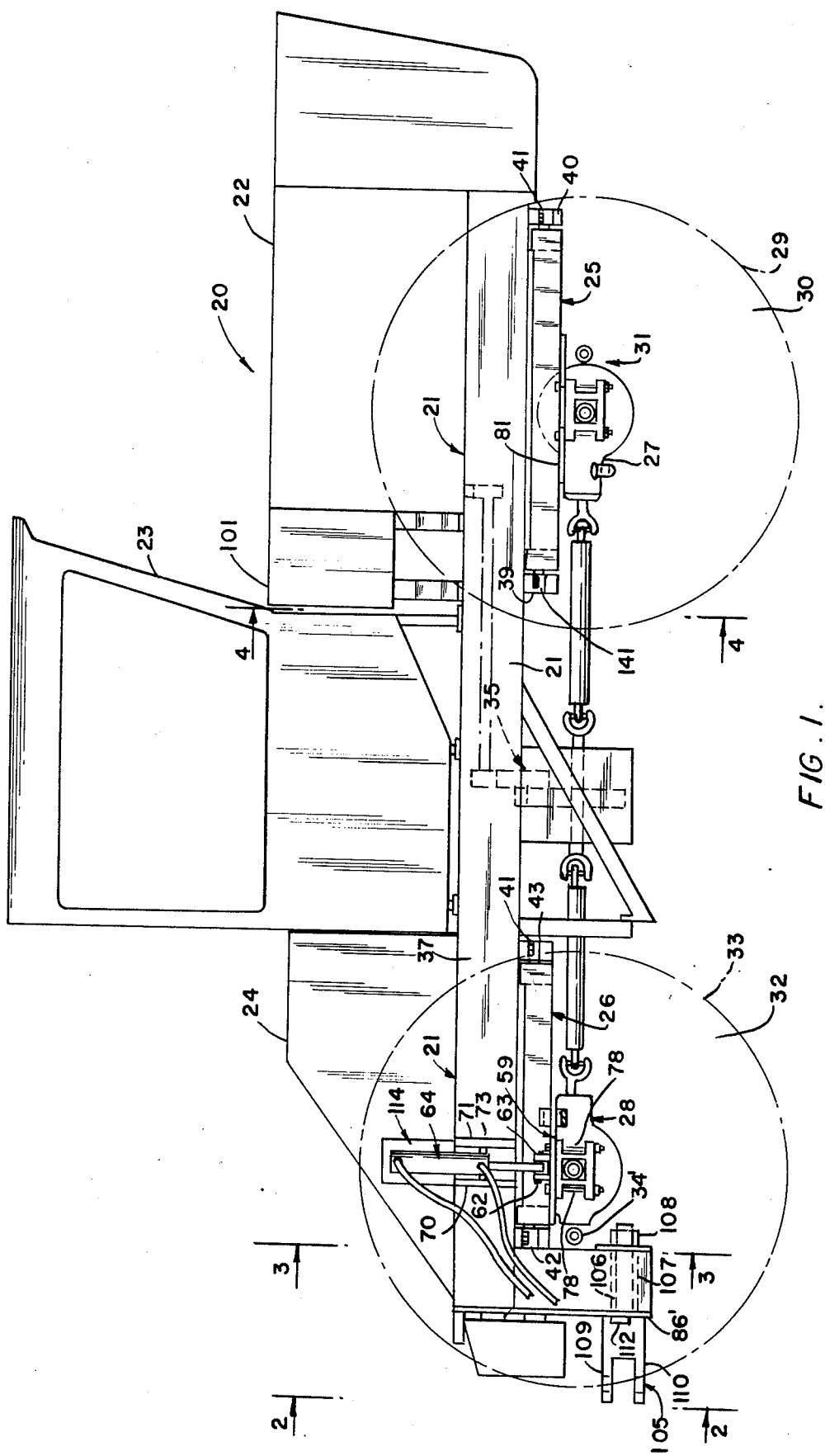
FIG. 1 is a side elevational view of the automatic self leveling four wheel drive tractor.
Figure 2:
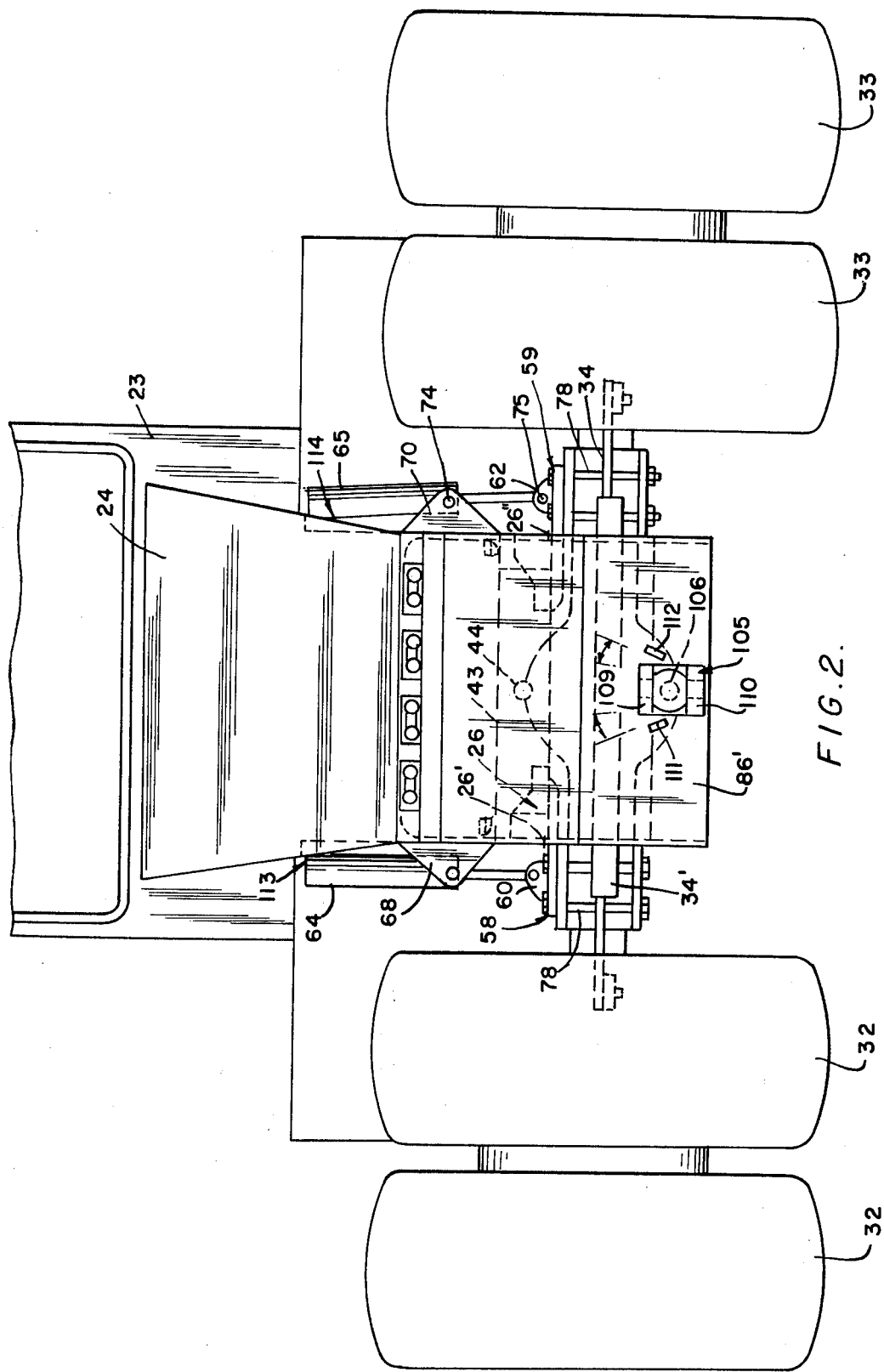
FIG. 2 is a rear elevational view of the four wheel drive tractor with the tractor or level ground.

Referring more particularly to the drawings in FIG. 1, the four wheel drive tractor invention 20 is illustrated as having a conventional main frame 21, with a conventional tractor engine 22, mounted on the front of the main frame, an operators cab 23 mounted on the central portion of the main frame, and a fuel tank 24 mounted on the rear of the main frame all in a conventional manner.

The tractor has a front sub frame 25 and a rear sub frame 26 with a conventional rear axle 28 mounted to the rear sub frame and a conventional front axle 27 mounted to the front sub frame. The front axle has a pair of wheels 29 and 30 mounted at the outer ends of the axles, with a conventional type steering connection 31 between the wheels and axle to enable the wheels to be turned.

The rear axle has a dual pair of wheels 32 and 33 mounted at the other ends of the rear axle, with a similar conventional type steering connection 34 between the wheels and the axle to enable the rear wheels to be turned. The steering system is essentially the same for both the front and rear axles. It is of a type having outwardly opposed cylinders 34' with the cylinder portions pivotally mounted to the axle housing and with the pistons projecting laterally outwardly toward the wheels and with the piston ends pivotally mounted to the sleeve portion adjacent the wheels for turning the wheels relative to the axles. Also, the tie rods connect the sleeve portion of the wheels together to assure that they turn in unison.

The front and rear wheels are power driven by the tractor engine 22 through a conventional drive transmission 35 generally shown in FIG. 6.

The main frame 21 of the tractor is formed of a pair of steel C-shaped channel beams 36 and 37 which extend along the underside of the tractor to support the engine, cab, fuel tank, and other conventional components of the tractor thereon. The beams 36 and 37 are fixed together in spaced parallel relation at the rearward end by a plate 86' and at the forward end by the engine being mounted to the beams.

A pair of laterally extending sub frame support members 39 and 40 are mounted laterally across the underside of the channel beams 36 and 37 in spaced relation to one another and are fixed to the beams 36 and 37 by bolts 41.

A similar pair of laterally extending sub frame support members 42 and 43 are mounted laterally across the underside of the rearward portion of channel beams 36 and 37 and fixed to the beams 36 and 37 by bolts 41.

The front axle sub frame 25 is pivotally mounted to the support members 39 and 40 to pivot about a horizontal axis 44 extending centrally and longitudinally from the front to the rear of the tractor.

The rear axle sub frame 26 is also pivotally mounted to the axle support member 42 and 43 to pivot about the horizontal axis 44 adjacent the rear of the tractor.

The front axle frame 25 is rectangular in shape having a front and rear end member 45 and 46 and side members 47 and 48 fixed together at their corners to form the rectangular frame, (see FIG. 5).

The front axle frame 25 is pivotally mounted about axis 44 by a pair of cylindrical pins 49, which pins are fixed in bores in members 39 and 40, respectively. The pins are rotatably mounted in bores 50 and 50' the front and rear end members 45 and 46, respectively, to thereby pivot the front axle frame 21 about the member 39 and 40 and relative to the main frame by the end members pivoting about pins 49.

The front axle frame can pivot or tilt approximately 19° to 20° in either direction from horizontal for a total travel of approximately 40° from its one extreme position to its other extreme position.

The rear axle frame is rectangular in shape having a front and rear end members 51 and 52 side members 53 and 54 together at their corners to form the rectangular frame.

The rear axle frame 26 is pivotally mounted about axis 44 by a pair of cylindrical pins 55 which pins are fixed in bores in members 42 and 43, respectively. The pins are rotatably mounted in bores 56 and 56' the front and rear members 51 and 52 to thereby pivot the rear axle frame 26, relative to the support member and the main frame by the end members 51 and 52 of the frame pivoting about pins 55.

The rear axle frame 26 can pivot or tilt relative to the main frame axis 44 a maximum of approximately 15° in either direction from a parallel position with the main frame for a total travel of approximately 30° from its one extreme position to its other extreme position. A pair of metal pins or stops 26' and 26" are provided with are fixed to the top of the plate members 58 and 59, respectively, which engage the beams 36 and 37 when the rear axle frame pivots, so that the rear axle frame 26 does not pivot quite as far as the front axle frame.

The rear axle frame 26 has a pair of treadle or pivot plates 58 and 59 fixed to side members 53 and 54, respectively, and projecting outward from and side members in opposite relation and projecting outward beyond the side beams 36 and 37 to pivot the rear axle frame.

A pair of lugs 60 and 61 are fixed to the treadle plates 58 on one side of the frame 26. A pair of lugs 62 and 63 are fixed to the plate 59 in the other side of the rear axle frame 26.

Figure 3:
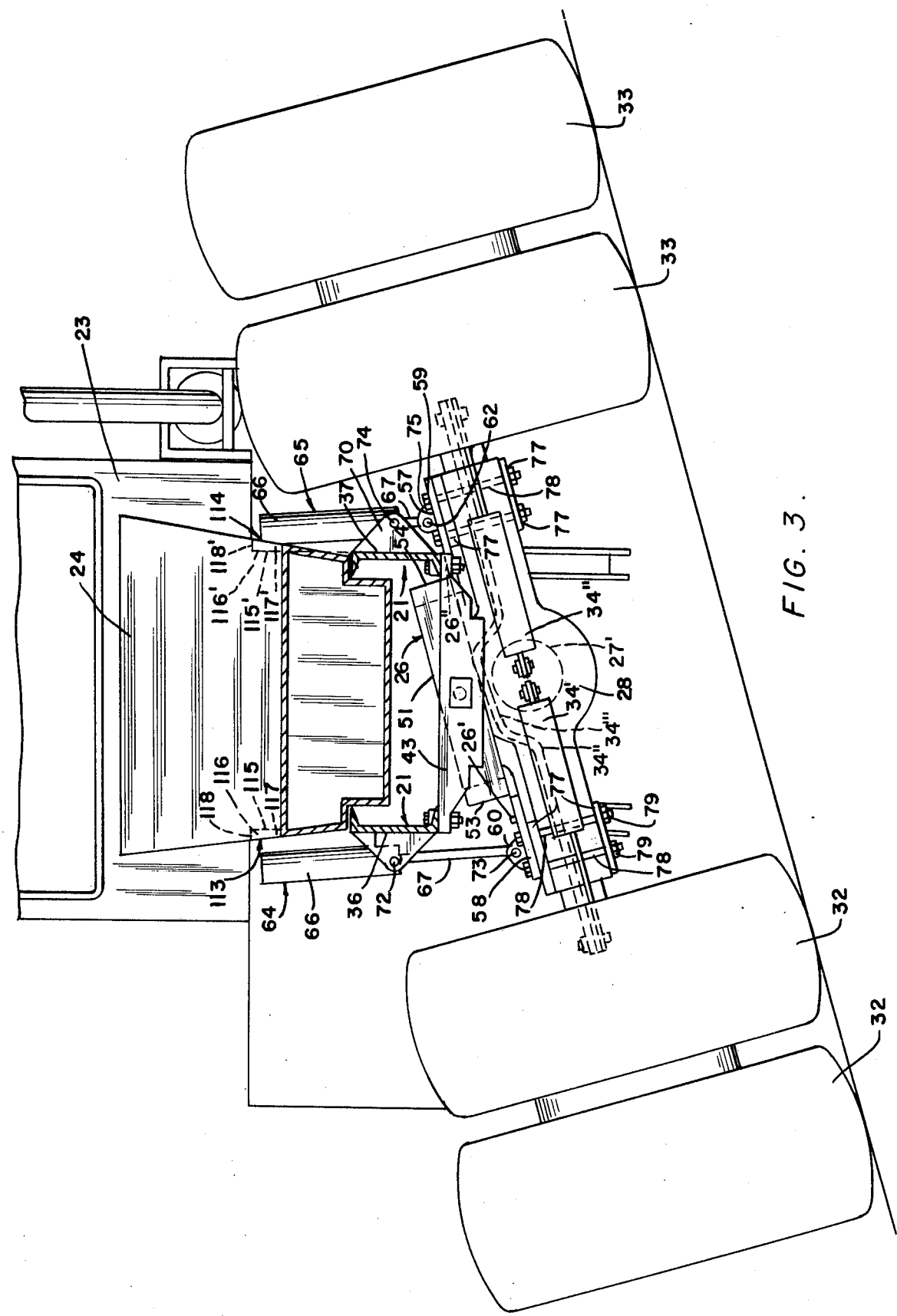
FIG. 3 is a cross-sectional view of the four wheel drive tractor with the rear wheels and rear axle sub frame pivoted or tilted at an angle to travel along angular terrain and with the hydraulic cylinders leveling the main frame of the tractor.
Figure 4:
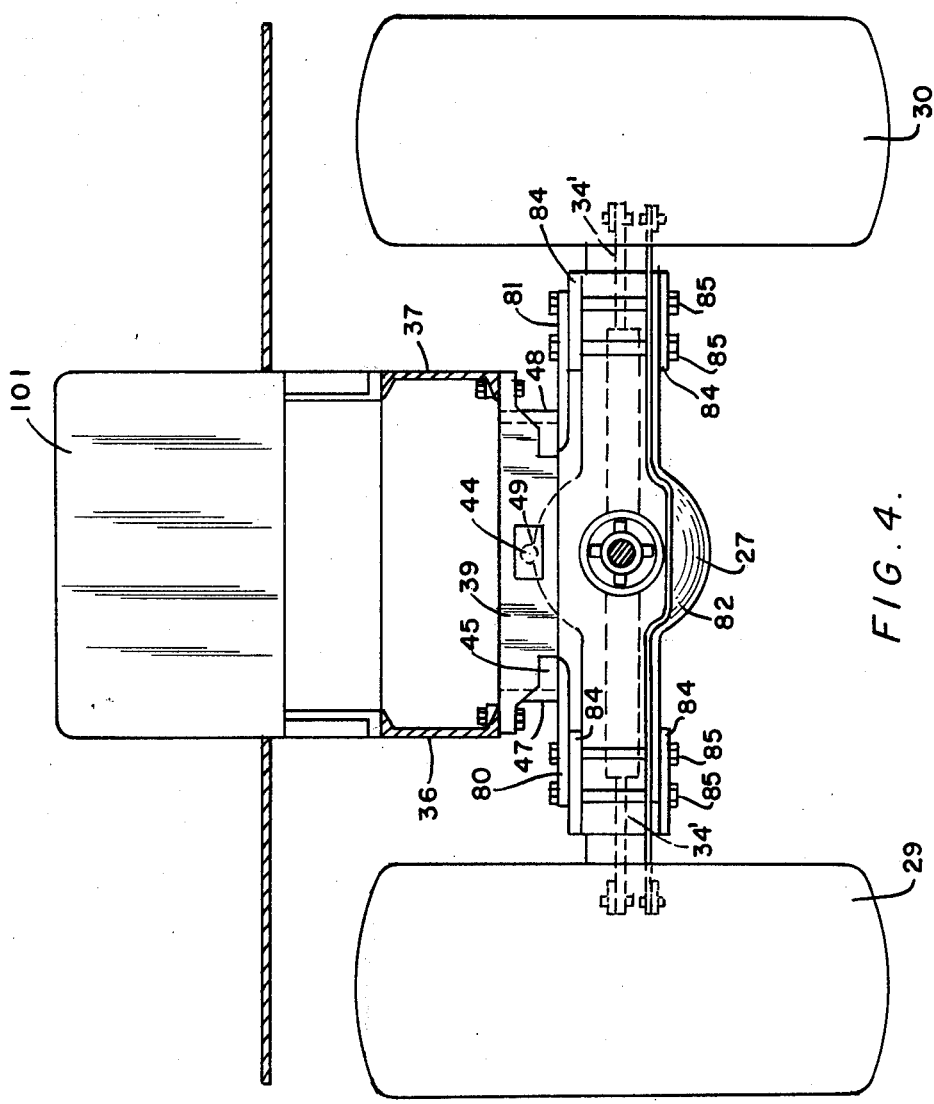
FIG. 4 is a cross-sectional view of the front of the tractor illustrating the main frame and pivoting sub frame, front axle, and wheel connection to the main frame.

A pair of conventional hydraulic actuated cylinders 64 and 65 are positioned on opposite sides of the rearward portion of the tractor. The hydraulic cylinders have each a cylinder portion 66 and a piston 67. The pistons are hydraulically actuated in either direction in the respective cylinders, as illustrated in FIG. 3.

The main frame 25 has a pair of lugs 68 and 69 fixed to the side beam 36 and a pair of lugs 70 and 71 fixed to the beam 37.

The cylinder 64 has its cylinder portion 66 pivotally mounted to lugs 68 and 69 on beam 36 at pivot point 72. The cylinder 64 has its piston 67 pivotally mounted to lugs 60 and 61 on plate 58 at pivot point 73.

The cylinder 65 has its cylinder portion 66 pivotally mounted to lugs 70 and 71 on beam 37 at pivot point 74. The cylinder 65 has its piston rod 67 pivotally mounted to lugs 62 and 63 on plate 59 at pivot point 75.

The rear axle 28 of the tractor has a conventional housing 76 with projecting upper and lower flanges 77 on opposite sides of the outer ends of the axle. Bolts 78 pass through bores in the plates 59 and 58 and through bores in the flange 77 of the housing of the rear axle and nuts 79 are threaded onto the other ends of the bolts 78 to fix the flanges of the axle housing to the plates 59 and 58 so that the rear axle 28 will pivot with the rear axle sub frame 26 and about axis 44 on pins 55, relative to the main frame 21 of the tractor.

The front axle frame 25 also has a pair of projecting plates 80 and 81 which are fixed to opposite side members 47 and 48, respectively, and which project outward from the frame and side beams 36 and 37.

The front axle 27 of the tractor has a conventional housing 82 with projecting flanges 84 on the upper and lower opposite sides of the outer ends of the axle and are fixed to the housing. Bolts 83 pass through bores in the plates 80 and 81 and through bores in the flanges 84 of the housing of the front axle. Nuts 85 are threaded onto the outer ends of bolts 83 to fix the flanges 84 to the plates 80 and 81, thereby fixing the front axle 27 to the front sub frame so that the front axle will pivot with the front axle frame 25 about the axis 44 or pin 49 relative to the main frame of the tractor.

A conventional mercury actuated leveling unit 86 is centrally mounted inside the cab 23 which actuates and controls the hydraulic cylinders 64 and 65. The cylinders 64 and 65 will operate in reverse relative to one another, so that when one cylinder piston is telescoping the other cylinder piston is retracting.

The mercury actuated leveling unit 86 has a conventional construction having a rectangular hollow tube 86" with mercury 87 filled into the tube to the level 89. The mercury 87 is in electrical contact with a ground contact 88 to provide an electrical connection to ground. The rectangular tube has projecting tubular ends 90 and 91 with electrical contacts 92 and 93 in the tubular ends.

The mercury unit is mounted upright and parallel across the center of the cab 23 of the main frame 21 so that when the main frame is horizontal, relative to axis 44, the mercury unit is upright and horizontal, as illustrated in FIG. 6.

OPERATION

When the tractor 20 is operated on level ground and then begins to travel along an inclined hillside 94 of a hill in direction generally parallel to the top of the hill, since the front and rear wheels on both sides of the tractor will be in contact with the inclined surface 90 of the side hill, the wheels on the right side 91 of the tractor will be higher than the wheels on the left side releasing the wheels, axles, and front and rear subframes to tilt to the side, as illustrated in FIG. 1.

The action of tilting the wheel, axles, and subframe to one side toward the angle illustrated in FIG. 3 will also act to tilt the main frame 20 and the mercury unit 86 counterclockwise to one side when viewed from FIG. 6.

This tilting of the mercury unit 86 counterclockwise, as the main frame begins to tilt in a counterclockwise direction, will cause the mercury 87 in the tube to flow upward into the tubular outlet 90 and make contact with switch 92 so that current can flow through solenoid 95 through contact 92 along the mercury 87 to the ground and energize solenoid 95.

The pump 96 is conventionally energized by the tractor engine to deliver hydraulic fluid under pressure. The pump is continually driven during the operation by the tractor engine and has a conventional overflow relief valve to release and return excess fluid under pressure back to the reservoir if the fluid pressure becomes too high.

The energizing of solenoid 95 magnetically pulls the steel slide valve 97 from left to right, when viewed from FIG. 6, moving the slide valve out of its center position, shown in FIG. 6, to a right side position so that port 98 aligns with port 99 and 100. This is so that fluid beneath the piston in cylinder 64 and above the piston in cylinder 65 may flow out of the cylinders into the reservoir 101.

The pulling of the slide valve 97 to its right side position also aligns port 102 with ports 103 and 104 so that the pump will pump hydraulic fluid out of the reservoir 101 through ports 102, 103, and 104 into cylinder 64 above the piston and into cylinder 65 below the piston to cause the piston of cylinder 64 to telescope downward relative to cylinder 64. This causes the piston of cylinder 65 to retract upward to their position shown in FIG. 3. This action pivots the main frame 20 clockwise upward about the axes 44 or pins 55 and 49 until the main frame becomes horizontal again.

When the main frame becomes horizontal again, the mercury unit becomes horizontal and the mercury flows back out of the outlet 90 and loses contact with contact 92, which breaks the current to solenoid 95, deactivating solenoid 95 causing the side valve to return to its center position.

The slide valve has a spring return in either direction to draw the slide valve back to its center position when the solenoids are deenergized. When the slide valve is in its center position all of the ports are closed by the slide valve to lock the fluid in the cylinders so that the pistons are locked.

When the tractor operates on hilly terrain having an opposite inclination to that illustrated in FIG. 6, the left wheels on the left side of the tractor are tilted higher than the wheels on the right side of the tractor, the reverse operation takes place. This tilting of the wheels and axles and sub frame clockwise out of horizontal, tilts the main frame and mercury unit clockwise out of horizontal. The clockwise tilting action causes the mercury to flow up into the tubular end 91 and make contact with contact 93. This completes the circuit to solenoid 95' by the current flows through solenoid 95' through contact 92 along the mercury to ground.

The actuation of solenoid 95' slides the slide valve from right to left when viewed from FIG. 6 to a left side position to the left of its position shown in FIG. 6, so that port 98' aligns with port 99' and 100', so that fluid above the piston in cylinder 64 and below the piston in cylinder 65 may flow out of the cylinder into the reservoir.

The tilting of the slide valve to the left side position also aligns port 102 with port 103' and 104' so that the pump will pump hydraulic fluid out of the reservoir 101 through ports 104', 102, and 103' into cylinder 64 below the piston to retract the piston into the cylinder 64, and flow into cylinder 65 above the piston to cause the piston in cylinder 65 to telescope downward relative to the cylinder and the action of the pistons of the cylinders pivots the main frame about axle 44 clockwise relative to the wheels, axles, and sub frames, when viewed from FIG. 3, back until the main frame is horizontal again.

When the main frame becomes horizontal again the mercury unit becomes horizontal and the mercury flows back out of outlet 91 and loses contact with contact 93 which breaks the circuit to solenoid 95' causing the slide valve, with its spring return, to return to its center position.

When the slide valve is in its right side position, the slide valve closes the ports 103', 104', 99', and 100'. When the slide valve is in its left side position, the slide valve acts to close ports 103, 104, 99, and 100.

The mercury unit outlets 90 and 91 are placed at a sufficiently shallow angle to be sufficiently sensitive to actuate the cylinders in either direction, so as to level the main frame back to horizontal to maintain the main frame even and operator's cab in a horizontal position relative to the horizontal axis 44.

This maintenance of the main frame, engine, operator's cab, and other components normally fixed to the main frame, level, although the front and rear wheels are tilted to one side or the other, enables the main frame, engine, cab, to be level or horizontal when the tractor is traveling tilting to one side along the side of a hill in the manner generally illustrated in FIG. 3.

Since the subframes will tilt 15° in either direction before the subframes engage the main frame, the invention will maintain the main frame of the tractor level even when the wheels are tilted as much as 15 degrees in either direction.

By keeping the main frame, engine, operator's cab, and other components fixed to the main frame level or horizontal there is less chance of the tractor tipping over onto one side or the other while driving the tractor along on an angular side of a hill.

A draw bar 105 has a cylindrical shaft 106. The shaft 106 is rotatably mounted in a tube or sleeve 107. The sleeve 107 is fixed to the rear plate 86' of the main frame by being welded in a bore in the rear plate 86'. An enlarged nut 108 is fixed to the outer end of the shaft 106 to retain the shaft 106 in the tube. The front end of the draw bar has a pair of conventional for members 109 and 110 with bores therethrough for attaching a towing implement to the rear of the tractor.

The draw bar can rotate in the tube relative to the main frame, by its shaft 106 rotating in the tube 107, when the tractor is traveling at a side angle along the angular side of a hill, so that the towing implement may pivot relative to the main frame. The draw bar will pivot with the towing implement when the wheels and axles of the tractor are pivoted or tilted at an angle relative to the frame.

A pair of stops 111 and 112 are fixed on opposite sides of the draw bar in spaced relation to the draw bar to enable the draw bar to pivot to 15° in either direction within the limits of the distance between the stops and to prevent the draw bar from pivoting completely around.

The gasoline tank 24 has a pair of recessers 113 and 114 formed in opposite sides of the gasoline tank to provide clearance for the cylinders 64 and 65, respectively, to pivot during their operation. The recess 113 on the left side of the tractor, when viewed from FIG. 3 is formed by recessed back wall 115 and side walls 116 and 117 and top wall 118. The recess 114 on the right side of the tractor is formed by back wall 115', side walls 116' and 117' and top wall 118'.

Thus it will be seen that a novel tractor has been provided with a novel pivoting front and rear axle frames, rear axles and their wheels, and with self leveling hydraulic cylinders. The leveling action acts to level the main frame, engine, and operator's cab and other components fixed to the main frame, although, the front and rear axles and their wheels may be tilted to conform to the angle of the terrain. The leveling action enables the operator to handle the tractor more easily and provides greater safety to the operator when the tractor is operating at an angle along the angular side of a hill.

The front axle frame being able to pivot approximately 5° further in either direction than the rear axle frame enables the front axle frame to clear some obstacles, when both frames are at a tilt of 15°, which is the maximum for the rear axle frame. Also, this difference in the pivoting range is so that the sub frames (front and rear) will not engage the main frame at the same time continuously, as this may act to cause twisting of the main frame or damage to the main frame.

The tie rods 34" of the front and rear axle wheels are conventional. The rear axle tie rod has bowed up portion 34''' to enable the tie rod to move to the left or right when viewed from FIG. 3, without engaging the housing of the central neck portion 27' of the rear axle, when turning the rear wheels to the left or right. Also, the side members 53 and 54 are spaced far enough apart so that the tie rods 34" may move either to the left or right its normal distance without the lowered portion engaging the side members 53 or 54, when the rear wheels are turned to the left or right within their normal turning limits.

The tie rod 34" of the front axle wheels is bowed downward for the same purpose as the bowed up portion of the rear axle tie rod, and the side members 47 and 48 are spaced sufficiently far apart for turning the rear wheels without the bowed portion engaging the side members 47 and 48 within normal turning limits.

It will be obvious that various changes and departures may be made to the invention without departing from the spirit thereof. Accordingly, it is not intended that the invention be limited to that specifically described in the specification or as illustrated in the drawings, but only as set forth in the appended claims wherein:

What is claimed is:

1. A self leveling tractor comprising an elongated fixed main frame having a motor and cab mounted thereon, rear and front sub frames, said rear and front sub frame being positioned centrally and lengthwise below the rear and front portions respectively of the main frame, said sub frames each having opposing longitudinal side frame members parallel to the length of the main frame and front and rear lateral frame members perpendicular to the length of the main frame, with the longitudinal side frame members being of greater length than the front and rear lateral frame members, so that the length of the sub frames in parallel to the length of the main frame, projecting lug means on opposing side frame members of the rear sub frame projecting outwardly from beneath the main frame to fix a rear axle to the underside of the rear frame so that the rear sub frame rests generally on top of the rear axle, and spaced below the main frame when the rear sub frame is horizontal with the main frame, said front sub frame having means on the opposing side frame members to fix a front axle to the underside of the front sub frame so that the front sub frame rests generally on top of the front axle, said lateral front and rear members of said front and rear sub frame being pivotally mounted to the main frame, said pivotal mounting of said sub frames being each pivotally mounted on generally one common axis to one another, with the axis extending centrally and longitudinally along the length of the sub frames and main frame at a location spaced above the longitudinal center axis of the front and rear axles with the distance between the pivot points of the front and rear lateral members of the front and rear sub frames greater than the distance between the front and rear edge of their respective axles at the center of the axle, said rear sub frame being spaced above an input shaft to said rear axle, so that a drive shaft means may connect said motor to said rear axle that will pass beneath said rear sub frame member, said front sub frame member being spaced above an input shaft to said front axle so that a drive shaft means may connect said motor to said front axle that will pass beneath said front sub frame member, a fluid cylinder positioned above one of the side frame members on the rear sub frame with one end pivotally connected to the upper surface of said frame member and the other end extending upward and pivotally mounted to an opposing side portion of the main frame, motor and pump means to activate said cylinder, mercury activated leveling means to control the actuation of said valve and pump means to control the activation of said cylinder, with said cylinder when activated by said mercury activated leveling means pivoting said main frame relative to said rear sub frame to level the main frame to horizontal, when said rear sub frame has pivoted to one side or another due to being located on angular terrain.

* * * * *